(12) United States Patent
Miyoshi et al.

(10) Patent No.: US 11,175,845 B2
(45) Date of Patent: Nov. 16, 2021

(54) ADDING A MIGRATION FILE GROUP TO A HIERARCHICAL STORAGE MANAGEMENT (HSM) SYSTEM FOR DATA CO-LOCATION

(71) Applicant: INTERNATIONAL BUSINESS MACHINES CORPORATION, Armonk, NY (US)

(72) Inventors: Hiroyuki Miyoshi, Kawasaki (JP); Hiroshi Araki, Yokohama (JP); Takeshi Ishimoto, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/945,953

(22) Filed: Apr. 5, 2018

(65) Prior Publication Data
US 2019/0310789 A1 Oct. 10, 2019

(51) Int. Cl.
*G06F 3/06* (2006.01)

(52) U.S. Cl.
CPC .......... *G06F 3/0647* (2013.01); *G06F 3/0611* (2013.01); *G06F 3/0643* (2013.01); *G06F 3/0685* (2013.01)

(58) Field of Classification Search
CPC .... G06F 3/0647; G06F 3/0685; G06F 3/0643; G06F 3/0611
See application file for complete search history.

(56) References Cited

U.S. PATENT DOCUMENTS

| | | | |
|---|---|---|---|
| 5,822,780 A * | 10/1998 | Schutzman | G06F 16/9017 711/165 |
| 5,991,753 A * | 11/1999 | Wilde | G06F 16/10 |
| 6,330,572 B1 * | 12/2001 | Sitka | G06F 16/122 707/608 |
| 7,634,516 B2 * | 12/2009 | Cannon | G06F 16/1873 |
| 8,209,297 B2 | 6/2012 | Yanai et al. | |
| 8,756,199 B2 | 6/2014 | Sutoh et al. | |
| 9,760,305 B2 | 9/2017 | Hasegawa et al. | |
| 2003/0046270 A1 * | 3/2003 | Leung | G06F 16/13 |
| 2006/0101084 A1 | 5/2006 | Kishi et al. | |

(Continued)

FOREIGN PATENT DOCUMENTS

| | | |
|---|---|---|
| JP | 2006276926 A | 10/2006 |
| JP | 2008102590 A | 5/2008 |

OTHER PUBLICATIONS

List of IBM Patents or Patent Applications Treated as Related Jun. 15, 2020 (2 Pages).

(Continued)

*Primary Examiner* — Kalpit Parikh
(74) *Attorney, Agent, or Firm* — Griffiths & Seaton PLLC

(57) ABSTRACT

A system and method for adding a migration file group to a hierarchical storage management (HSM) system for data co-location are presented. A file group attribute may be automatically added to one or more files in the HSM system to enable one or more applications to co-locate data. The one or more files, having a similar file group attribute, may be migrated from one or more storage devices in a first tier in the HSM system to a tape storage device in an nth tier of the HSM system to enable recalling of the one or more files in the HSM system.

12 Claims, 7 Drawing Sheets

(56) References Cited

U.S. PATENT DOCUMENTS

| | | |
|---|---|---|
| 2009/0021403 A1* | 1/2009 | Chan ...................... H03M 7/30 |
| | | 341/50 |
| 2011/0010495 A1 | 1/2011 | Haustein et al. |
| 2011/0078112 A1* | 3/2011 | Takata ................ G06F 16/1748 |
| | | 707/622 |
| 2011/0320679 A1 | 12/2011 | Ashton et al. |
| 2012/0166389 A1 | 6/2012 | Shiozawa |
| 2015/0095294 A1 | 4/2015 | Tsuda |
| 2016/0162498 A1* | 6/2016 | Hasegawa ............... G06F 16/10 |
| | | 707/738 |
| 2017/0083437 A1 | 3/2017 | Hasegawa |
| 2017/0161155 A1 | 6/2017 | Haustein et al. |
| 2018/0018115 A1 | 1/2018 | Ikegame |
| 2018/0157413 A1 | 6/2018 | Kawamura et al. |
| 2019/0339896 A1 | 11/2019 | McCloskey et al. |

OTHER PUBLICATIONS

U.S. Appl. No. 16/381,971 dated Apr. 11, 2019, Hiroyuki Miyoshi.
U.S. Appl. No. 15/945,953 dated Apr. 5, 2018, Miyoshi et al.

* cited by examiner

500

MAPPING TABLE

| PHYSICAL TAPE IDENTIFIER | FILE GROUP |
|---|---|
| TAPE 1 | 1, 2, 3 |
| TAPE 2 | 4 |

ADDING A MIGRATION FILE GROUP TO A HIERARCHICAL STORAGE MANAGEMENT (HSM) SYSTEM FOR DATA CO-LOCATION

BACKGROUND OF THE INVENTION

Field of the Invention

The present invention relates in general to computing systems, and more particularly to, various embodiments for adding a migration file group to a hierarchical storage management (HSM) system for data co-location by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, processing devices, with the advent and further miniaturization of integrated circuits, have made it possible to be integrated into a wide variety of devices for personal, business, health, home, education, scientific, or governmental related areas of interest. As great strides and advances in technologies come to fruition, the greater the need to make progress in these systems advantageous for efficiency, communication, and improvement in society.

SUMMARY OF THE INVENTION

Various embodiments for adding a migration file group to a hierarchical storage management (HSM) system for data co-location using one or more processors are provided. In one embodiment, by way of example only, a method for adding a migration file group to a hierarchical storage management (HSM) system for data co-location, again by a processor, is provided. A file group attribute may be automatically added to one or more files in an HSM storage device to enable one or more applications to co-locate data. The one or more files, having a similar file group attribute, may be migrated from the HSM upper tier storage devices to a tape storage device of the HSM lower tier to enable efficient recalling of the plurality of files from the HSM lower tier.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
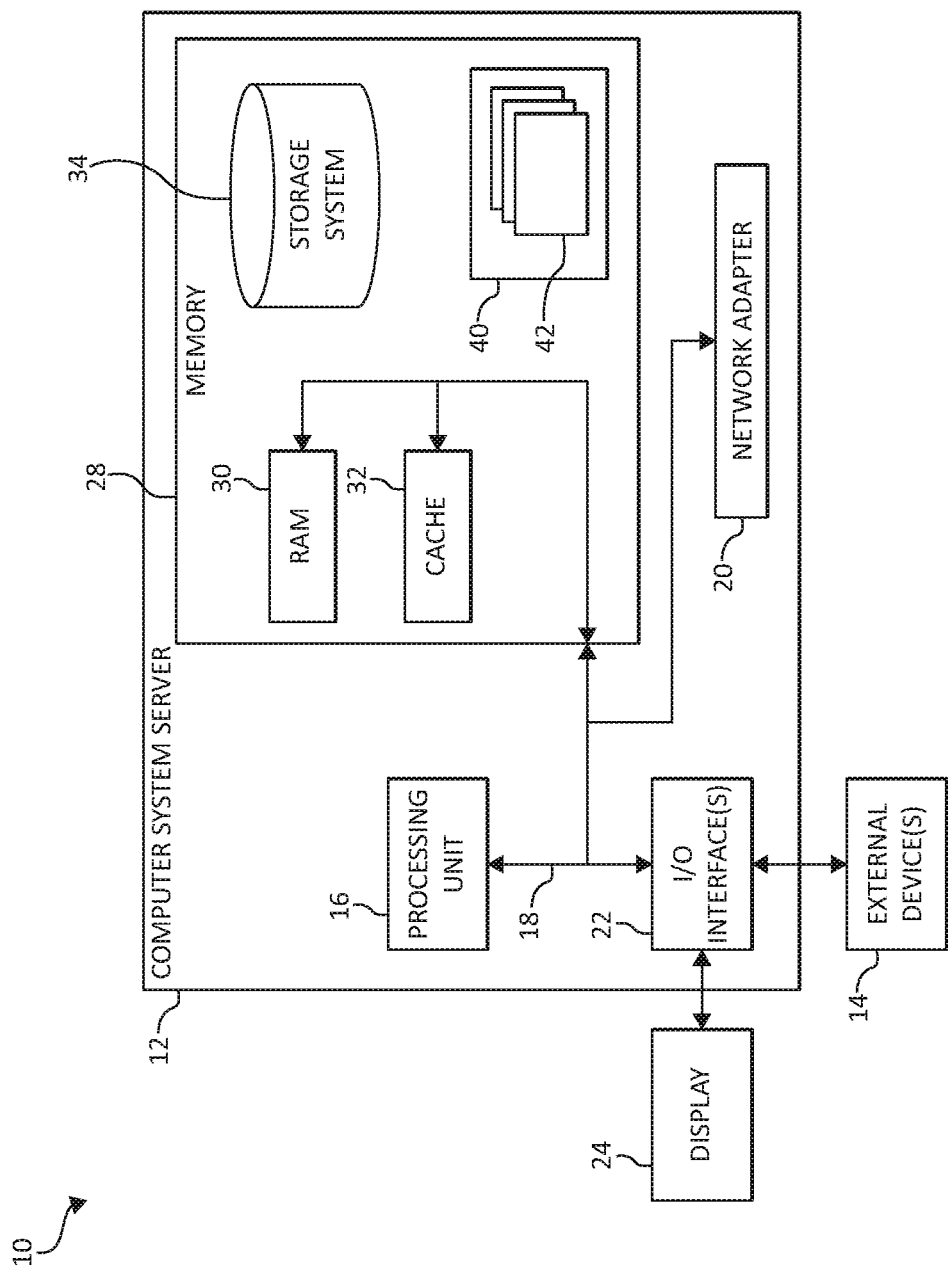
FIG. 1 is a block diagram depicting an exemplary computing node according to an embodiment of the present invention.

Hierarchical Storage Management ("HSM") is a data storage technique which automatically moves data between a primary and a secondary storage tier. HSM may also be referred to as tiered storage. In HSM systems, data files that are frequently used are stored on high-speed storage devices of the primary storage tier, such as flash drives or hard disk drive ("HDD") arrays. They are more expensive per byte stored than slower devices of the secondary storage tier, such as optical discs and magnetic tape drives. In short, HSM systems such as, for example, IBM® Spectrum Archive, executes transparent placement of frequently accessed data to fast Flash/HDD media and less frequently accessed data to tapes so as to reduce the total cost of ownership ("TCO").

In one aspect, a migration is to move data from Flash storage and/or HDD to tape device storage. A recall may be a transfer (e.g., move) of data from tape to Flash storage and/or HDD. As such, an HSM system may migrate data files from the primary disk drives to the secondary tape drives such as, for example, if they have not been used for a certain period of time, typically a few months. This data migration frees expensive disk space on the primary storage devices. If an application does reuse a file, which is on a secondary storage device, the data (e.g., file) is automatically recalled, that is, moved back to the primary disk storage. Due to this transparent file recall capability, the file remains accessible from a client application although it has been physically migrated to the secondary storage.

During a recall operation, the recall needs to locate the tape cartridge, load the tape cartridge to a tape drive, and seek the data (e.g., file) within the tape cartridge. The overhead is in minute order and is relatively slow compared to Flash storage and/or HDD. This is particularly true if there are multiple files saved in multiple tapes. The load and seek may occur many times and make the read extremely slow.

In one aspect, the present invention provides for an HSM system such as, for example, IBM® Spectrum Protect® and IBM® Spectrum Archive®, and the HSM system may support an operational feature called optimized recall (or "selective recall"). An optimized recall accepts a read of multiple files at once and changes the file order so that the number of load/seek is minimized. Still, if the files are saved in multiple tapes, all the tapes must be loaded at least once resulting in significant overhead. Therefore, a need exists to place files that may be read together afterwards in a single tape, which may be referred to as co-location. For example, current operational protocols, without the HSM of the present invention, fail to provide co-location, and rather, scan an entire filesystem, pick up the files to be migrated, select available tapes from a specified pool, and migrate files to those available tapes from the specified pool without migrating related files to a single tape.

Accordingly, various embodiments are provided herein for enabling one or more applications to co-locate data by adding new attributes/features to an HSM system (e.g., storage system). In one aspect, a new attribute, which may be herein referred to as "file group," may be added to each file in HSM systems (e.g., HSM storage systems) such as, for example, in an HSM storage system that includes tapes storage devices (e.g. IBM® Spectrum Archive®). The new attribute may be set by one or more applications per file. The HSM storage system may migrate one or more files under the same file group to the same tape storage medium. This enables applications to instruct the HSM storage system to migrate related files to the same tape and enables efficient recalls of files later.

For example, applications are enabled to determine the files that may be read together at a future period of time (examples of which may include a series of medical data of a patient or files under the same project or test for a development or simulation, astronomical research that calculates and/or archives massive amounts of data that have files that are strongly related and want to co-locate). In one aspect, a storage management operation (which may be external to HSM storage) may optimize placement of data among multiple storages (e.g., all Flash storage, disk storage, HSM storage, cloud storage, etc.) based on the file attributes, filename extensions or contents thereby enabling an application to locate related files.

It should be noted, as a preliminary matter, that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
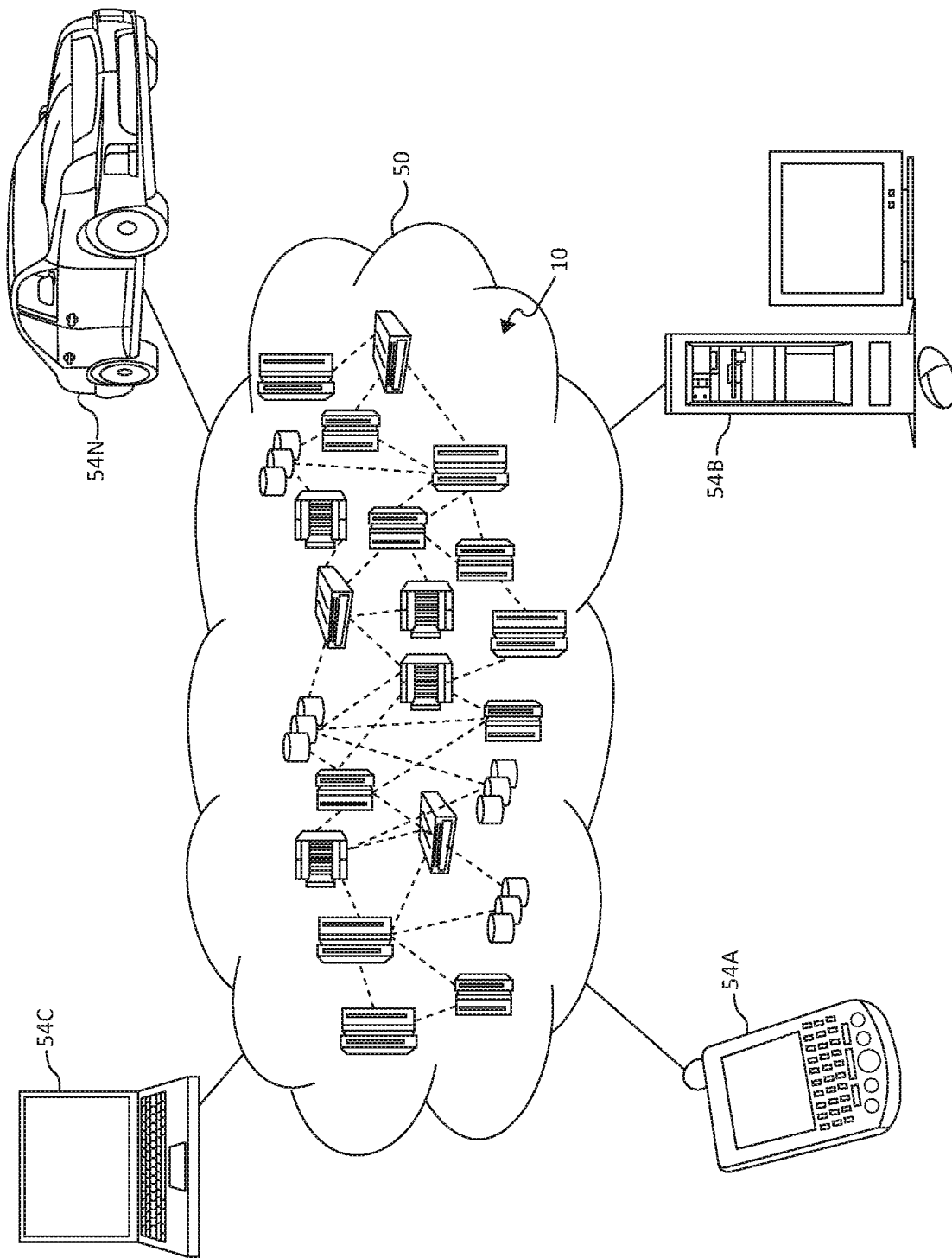
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
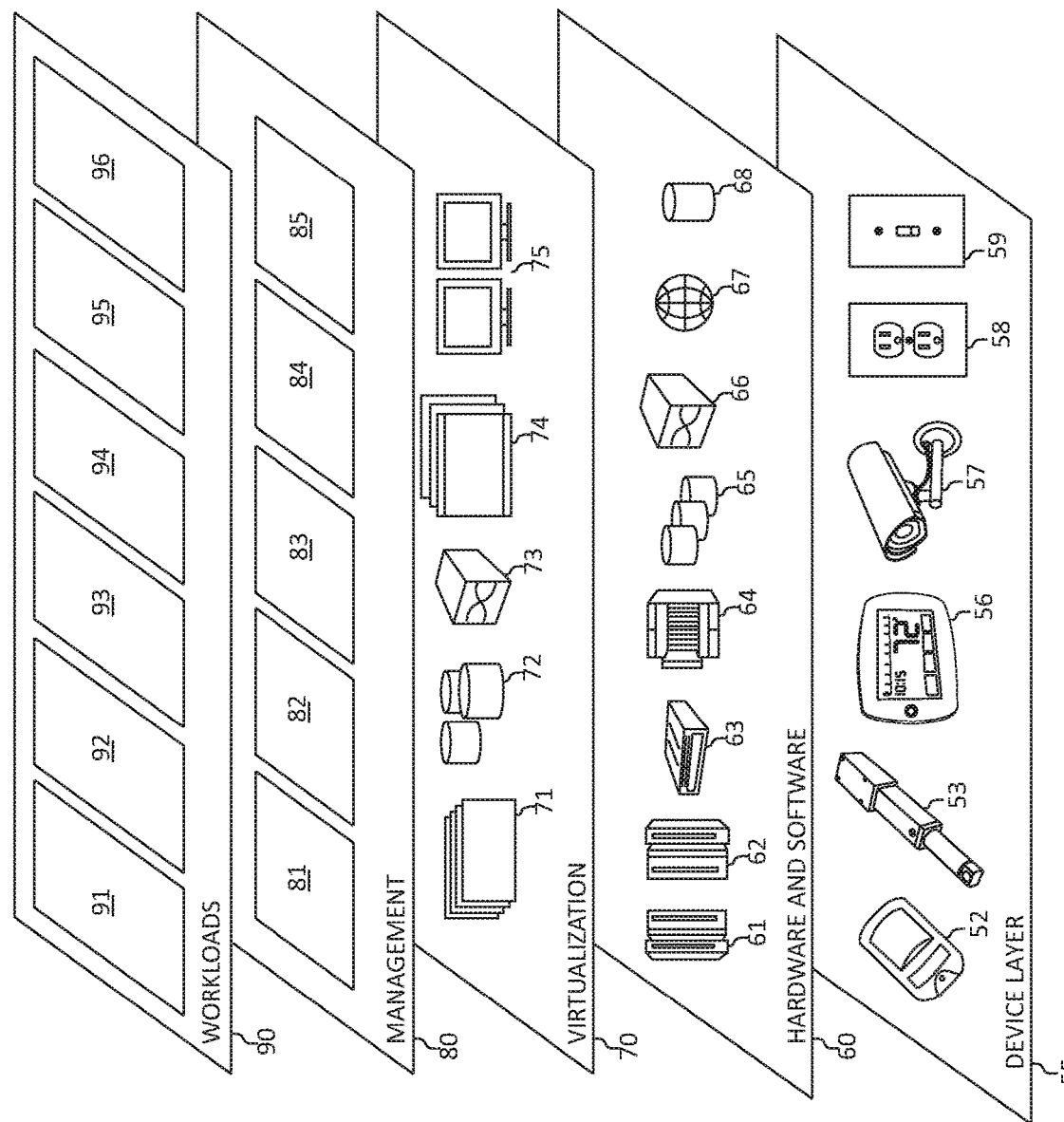
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for adding a migration file group to an HSM system for data co-location. In addition, workloads and functions 96 for adding a migration file group to an HSM system for data co-location may include such operations as data analytics, data analysis, and as will be further described, notification functionality. One of ordinary skill in the art will appreciate that the workloads and functions 96 for adding a migration file group to an HSM system for data co-location may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

In one aspect, the mechanisms of the illustrated embodiments provide a novel approach for adding a migration file group to an HSM system for data co-location. In one embodiment, a file group attribute may be automatically added to one or more files in the HSM system to enable one or more applications to co-locate data. The one or more files, having a similar file group attribute, may be migrated from a storage device in a first tier in the HSM system to a tape storage device in an nth tier of the HSM system to enable recalling of the one or more files in the HSM system.

Figure 4:
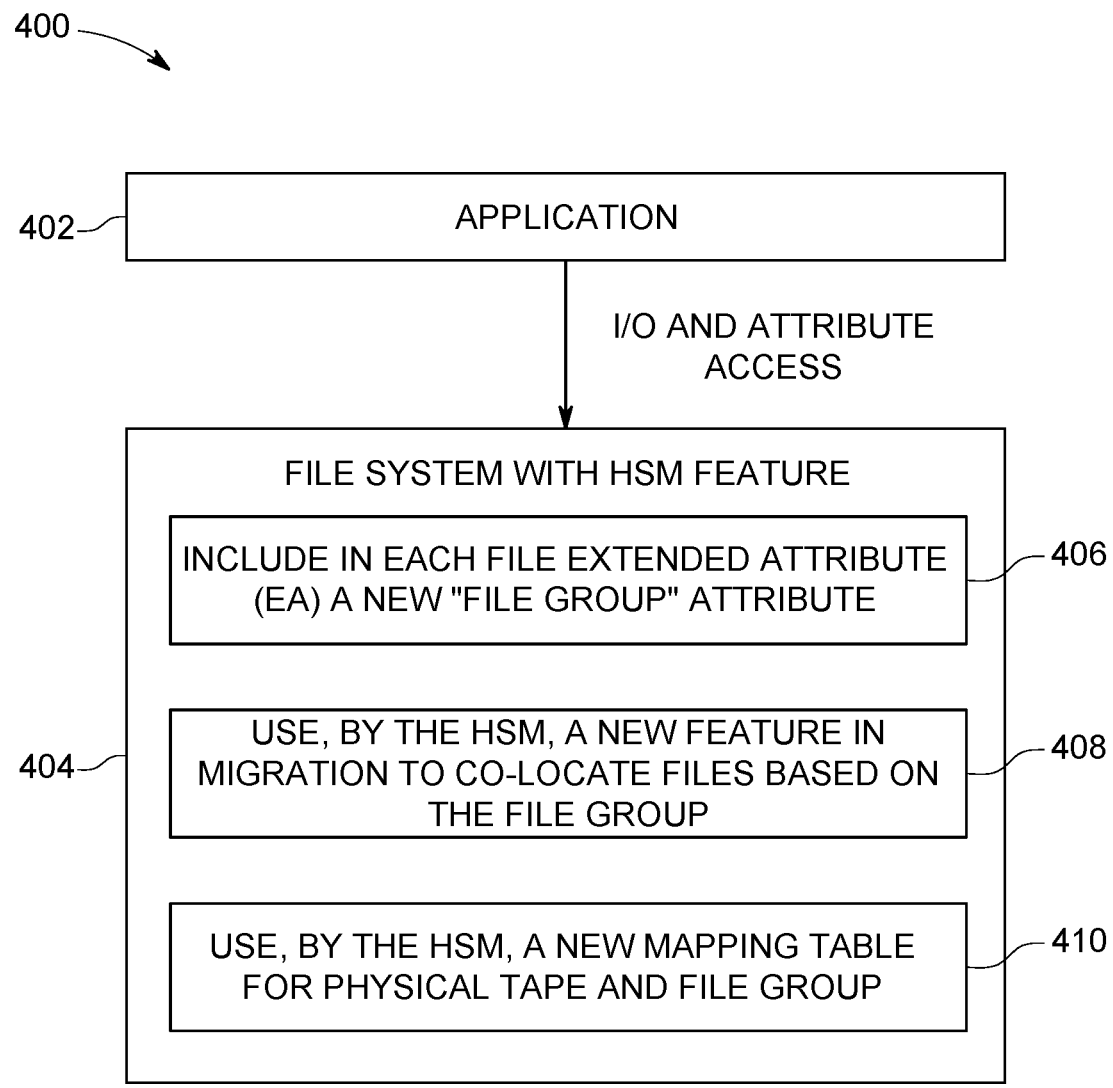
FIG. 4 is an additional block diagram depicting an HSM system for adding a migration file group according to various aspects of the present invention.

Turning now to FIG. 4, a block flow diagram of an HSM system 400 for adding a migration file group to an HSM system for data co-location is depicted. As will be seen, many of the functional blocks may also be considered "modules" of functionality, in the same descriptive sense as has been previously described in FIGS. 1-3. Many of the functional blocks 400 may execute as background processes on various components, either in distributed computing components, or on the user device, or elsewhere, and generally unaware to the user performing generalized tasks of the present invention. Also, one or more aspects of FIGS. 1-3 may also be included with and/or implemented with FIG. 4.

In one aspect, one or more applications are allowed to set a file attribute such as, for example, a new file attribute called "file group," which may be introduced to each of the files in the HSM storage, as in block 402. That is, an Input/Output ("I/O") for read/write access of file data and a command or application programming interface ("API") may be provided to the file system for attribute access and may specify an attribute (e.g., file group) for each file. In an HSM storage system 404, each file extended attribute (EA) may include the new "file group" attribute, as in block 406. The HSM storage system 404 may be enabled with a new feature of operation to co-locate files (during migration) based on the new "file group" attribute, as in block 408. The HSM storage system 404 may also use a mapping table (see FIG. 5) for physical tape and file group, as in block 410.

Moreover, when a file is to be migrated, the HSM storage may refer to file groups and save the files in the same file group on the same tape storage device. The file group attribute may be required when files are to be migrated. Because of the nature of the file group attribute, the value of the attribute is not determined when a file is migrated. Rather, the value of the file group attribute may be determined when the file is created or when operations, including READ operations, by a user application are determined.

For example, consider the example implementation of the file group attribute. The file group attribute may be represented by a 64-bit value, for example. The 64-bit value may be stored in an Extended Attribute (EA) of a file. When the file is migrated and the file's stub file is created on a Flash storage and/or HDD, the EA may exist in the inode block (on the Flash/HDD) of the stub file. Accordingly, the EA can be read and changed regardless of the migrate state. A default file group value may also be available. When a new file is created, the HSM saves the default value. In one aspect, the present invention may leverage existing commands and application programming interfaces ("APIs") provided by a file system to be used to change the file group value of each file. Thus, the present invention eliminates any need to add new features needed to change the file group value by an application or add new features to refer to or check the file group from an application.

The HSM system may provide one or more selected commands for migration. For example, HSM systems such as, for example, IBM® Spectrum Archive may provide a migrate command (e.g., a linear tape file system ("ltfsee") migrate command), which specifies a list of files to be migrated and the target tape library and tape pool. A new entry, fileGroup, may be added to allow a file group to be specified for the file list and the HSM storage system may ultimately overwrite the value of EA with that value and use the value. A sample of the file list that can be specified to the migrate command may be:
Existing Command
  /gpfs/gpfs0/archive/test1/test_file_1
New command (may be changed to XML, for example):

```
<file>
    <path>/gpfs/gpfs0/archive/test1/test_file_1</path>
    <fileGroup>1</fileGroup>
</file>
```

The HSM system may provide special or selected commands for determining whether a file is migrated. For example, in case of IBM® Spectrum Archive, the file group value for each file can be added to the output of "ltfsee info files" command, which shows the migrate status for each file.

Figure 5:
FIG. 5 is a block diagram depicting a mapping table in a hierarchical storage management (HSM) system for data co-location according to various aspects of the present invention.

Turning now to FIG. 5, a mapping table 500 in a hierarchical storage management (HSM) system for data co-location is depicted. In one aspect, the mapping table 500 maps between physical tapes in a pool and file groups in the HSM storage. The mapping table 500 is automatically created/updated by the HSM when migration is performed, as will be described later. The HSM may provide a special command user interface to allow the user to configure the mapping table. For example, a physical tape identifier and a file group attribute may be included. A tape cartridge such as, for example, tape 1 may be associated with file groups 1, 2, or 3. Tape 2 may be associated with file group 4.

In operation, by way of example only, in response to a migrate command to request migration issued from an application, the HSM storage may read the value of the file group of files to be migrated. If the value of a file group is the default value, co-location may not be performed. The files may be migrated to an available tape in a specified pool as is conventionally done. If multiple tape drives/storage devices are available, migration may be performed to the tape drives in parallel. If the value of a file group is not the default value, the mapping table may be consulted. If the file group has been registered, the tape storage device associated with the file group may be selected. If the file group has not been registered, the file group may be associated with an available tape storage device (the mapping table is updated).

If there is not available space on the tape, a new tape may be selected and may be also associated with the file group.

If multiple tape drives are available, then migration may be performed to the multiple tape drives in parallel only if there are multiple file groups to be migrated and the file groups are associated with different tapes. Parallel migration may be also performed if file groups include files with the default value.

In one aspect, each application may not be required to specify an absolute value to specify a file group. Rather, a command option of the HSM storage may be implemented and used that specifies that all the files to be migrated should be included in the same group. The HSM may create a new file group value and add the file group to the mapping table 500.

Thus, each application may be enabled to specify related files to be included in the same group before migrating the files to a tape storage device after creating the files in the HSM storage. By storing a file group value in the EA of files, the application may set a file group for each file at any time. It should be noted that reading and setting a file group does not require any new functions or features. Rather, the mechanisms of the present invention ensure that the files in the same file group will be saved on the same tape particularly for reading and setting the file group. When reading and/or recalling files at a later period of time, the requirement to load multiple tapes by the application is eliminated therefore the performance is significantly improved compared to reading and/or recalling the files that are distributed among multiple files. Optimized recall of multiple files is also effective, where the files are reordered and read so that useless seeks are minimized. That is, the optimized recall may include providing a list of multiple files to the HSM and the HSM is enabled to recall all those files in any order. The HSM may recall files in the most efficient file order so that the tape load/unload operations and the file seek within a tape operation are minimum (e.g., minimized or reduced).

If all the related files are included in a single file group, the files are always sequentially migrated and the migration performance decreases. Therefore, files that belong to a default file group may be migrated to multiple available tapes in a pool, in parallel, using all available drives. Migration, which uses co-location, may be performed only for files for which a file group is explicitly specified by an application.

The HSM system may have a collection of tape storage devices, called pools, and migration may be performed by specifying the files and a pool. In one aspect, one or more tape storage devices may be assigned to one pool. In one aspect, the present invention provides for migrating multiple, specified files to one tape storage device by assigning only one single tape to a pool.

However, the assignment of only one single tape to a pool may include the following drawbacks and may reduce computing efficiency. For example, as the number of pools increases, a migration policy may be required for each of the pools, which may yield some difficulty in creation and maintenance of the policies. In particular, in relation to co-location, related files need to be selected using directories from which files to be migrated are selected and policy rules and other policies that take into consideration the capacity of a Flash/HDD, making operation further complicated. Moreover, when an application changes the definitions of related files, the complexity of following policies increases and maintenance of the policies is difficult. Also, maintenance may be cumbersome since whenever the tape in each pool becomes full, a tape needs to be manually added. Also, pools, tapes and migration policies may be managed by IT administrators whereas files are created by end users. Only the end users know the contents of the files, how the files are referred to, and an extent the files are related to. Also, pools that include only one tape may impose a significant burden on administrators because the administrators are required to know in detail what directories are to be used and how much data to be placed in respective directories by the end users.

Accordingly, the present invention provides for one or more tape storage devices to be assigned to one pool. One or more applications may write a file group in the EA of each file at any time, the HSM manages mapping between file groups and tapes and performs migration by taking co-location into consideration, thereby achieving co-location.

In one aspect, the HSM may include a storage and a plurality of tape storage devices. A file group for a plurality of files may be set and/or assigned to be stored in the storage. The plurality of files, belonging to the file group, may be migrated from the HSM storage to one single tape storage device. A new recall operation which takes the file group as the specifier can be possible. When a recall operation, which specifies a file group, is executed, the plurality of files belonging to the file group may be recalled from one tape storage device to the HSM storage.

Figure 6:
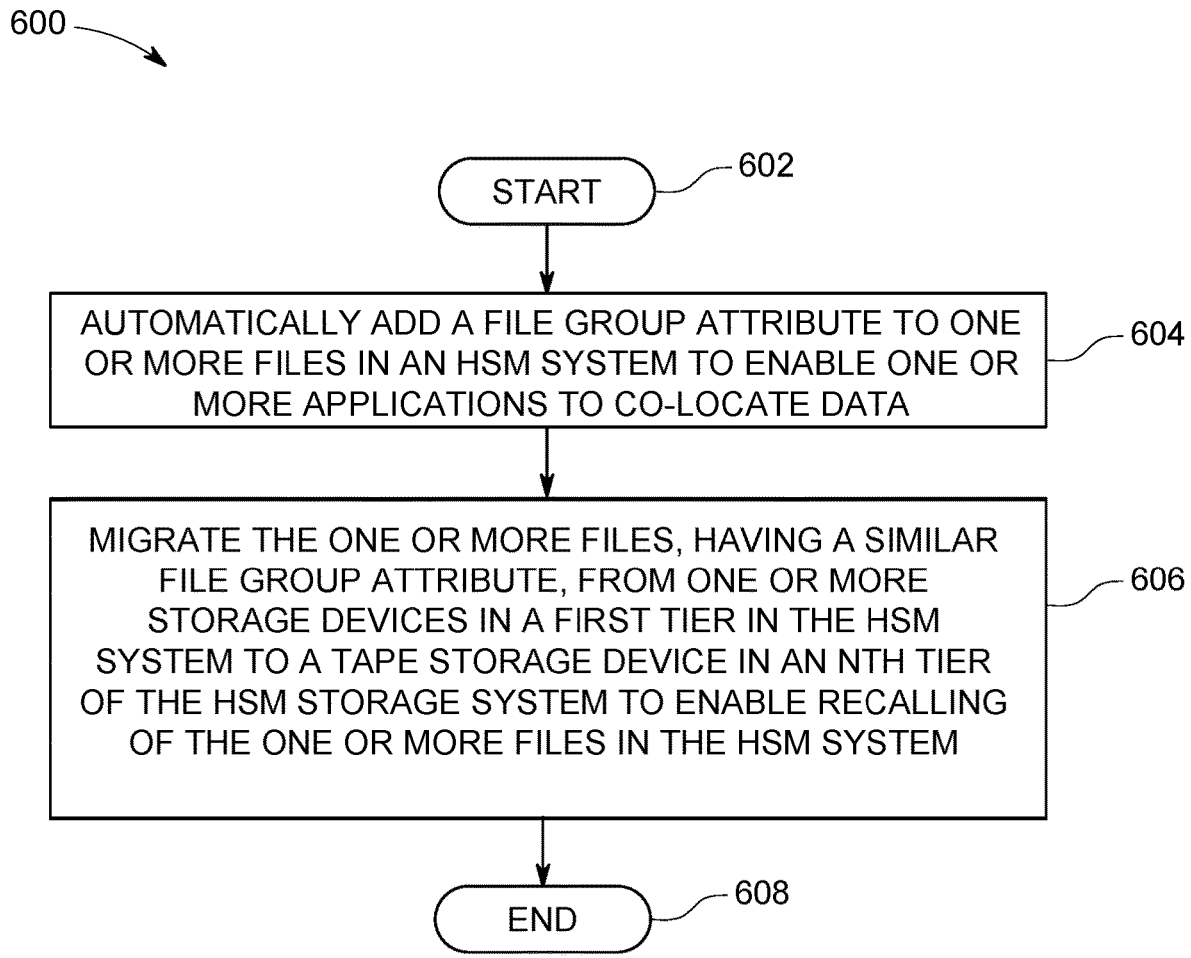
FIG. 6 is a flowchart diagram depicting an additional exemplary method for adding a migration file group to a hierarchical storage management (HSM) system for data co-location by a processor, again in which aspects of the present invention may be realized.

Turning now to FIG. 6, a method 600 for adding a migration file group to a hierarchical storage management (HSM) system for data co-location using a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. In one aspect, the functionality, operations, and/or architectural designs of FIGS. 1-5 may be implemented all and/or in part in FIG. 6.

The functionality 600 may start in block 602. A file group attribute may be automatically added to one or more files in the HSM system to enable one or more applications to co-locate data, as in block 604. The one or more files, having a similar file group attribute, may be migrated from one or more storage devices (e.g., multiple flash/HDD drives, etc.) in a first tier in the HSM system to a tape storage device (e.g., a single tape storage device) in an nth tier (e.g., lower, last, or final tier) of the HSM system to enable recalling of the one or more files in the HSM system, as in block 606. That is, when a file is created in the HSM system, data first lands on a storage device in a first ("1$^{st}$") tier within the HSM system. A migration operation may migrate the data from the 1st tier storage device within the HSM system to a tape storage device in a lower tier (e.g., last tier) within in the HSM system. The functionality 600 may end, as in block 608.

Figure 7:
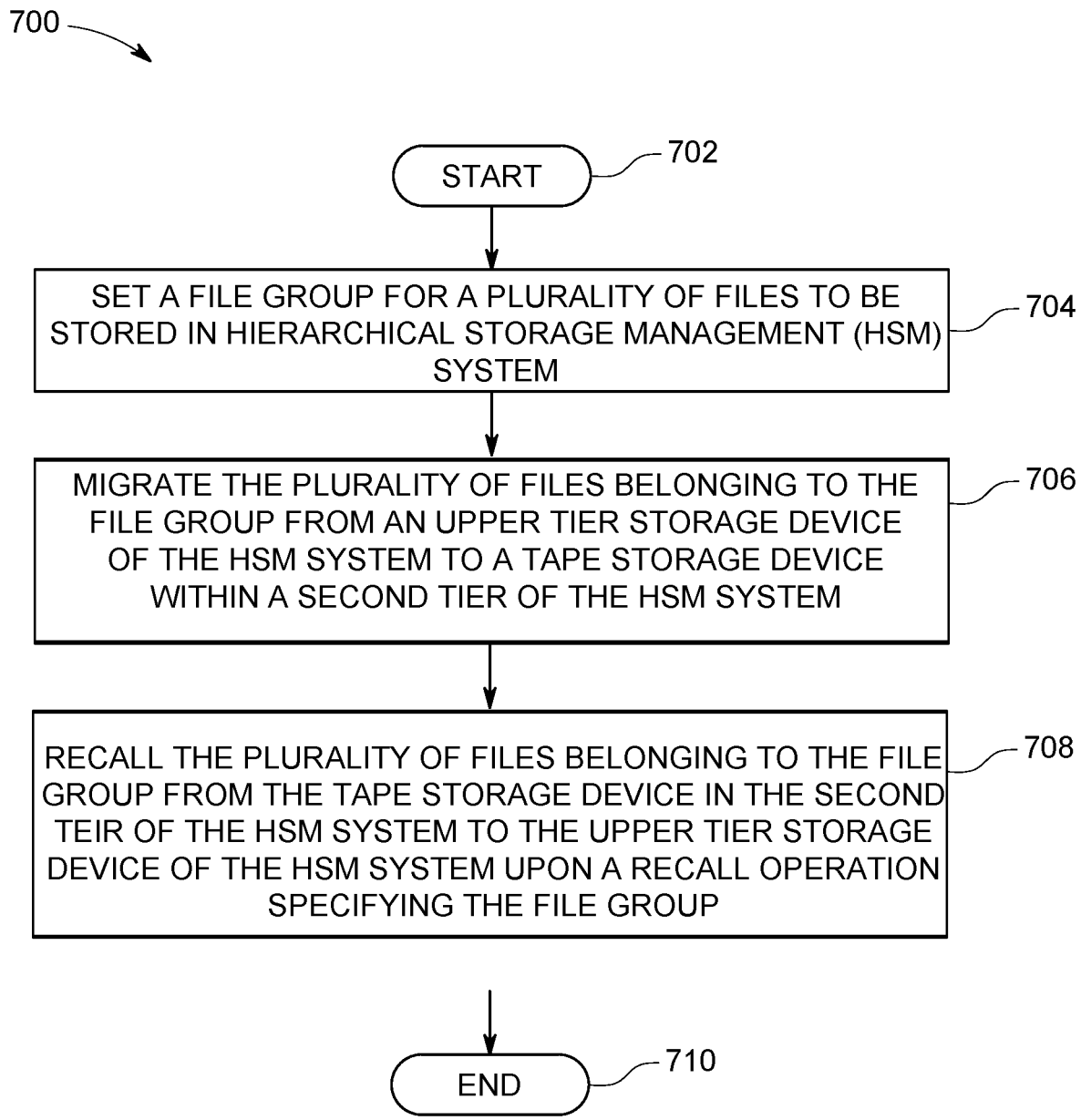
FIG. 7 is an additional flowchart diagram depicting an additional exemplary method for adding a migration file group to a hierarchical storage management (HSM) system for data co-location by a processor, again in which aspects of the present invention may be realized.

Turning now to FIG. 7, a method 700 for adding a migration file group to a hierarchical storage management (HSM) system for data co-location using a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. In one aspect, the functionality, operations, and/or architectural designs of FIGS. 1-5 may be implemented all and/or in part in FIG. 7.

The functionality 700 may start in block 702. A file group may be set for a plurality of files to be stored in Hierarchical Storage Management (HSM) system, as in block 704. The plurality of files belonging to the file group may be migrated from an upper tier (e.g., first storage device of the HSM system to a tape storage device within a second tier (e.g., lower, last, or final tier) of the HSM system, as in block 706. The plurality of files belonging to the file group may be recalled from the tape storage in the second tier (e.g., lower, last, or final tier) of the HSM system to the upper tier storage device of the HSM system upon a recall operation specifying the file group, as in block 708. It should be noted that the recall operation does not always have to be such that it takes the file group as the file specifier. Applications may read the related files at the same time and/or sequentially and since the files are stored in the same tape, the HSM may recall 2nd or later files. Also, applications can execute the optimized recall where it creates a file list and provide to HSM recall commands as the file specifier. Since all the files in the file list are in the same tape cartridge, the optimized recall is fast and efficient. The functionality 700 may end, as in block 710.

In one aspect, in conjunction with and/or as part of at least one block of FIGS. 6-7, the operations of methods 600 and/or 700 may include each of the following. The operations of methods 600 and/or 700 may set the file group attribute by one or more applications for the one or more files. The operations of methods 600 and/or 700 may automatically add the file group attribute to each file extended attribute (EA) of the one or more files. The storage devices in a first tier of the HSM system may include a hard disk drive (HDD), a flash memory device, or a combination thereof.

In an additional aspect, the operations of methods 600 and/or 700 may save the one or more files, having the similar file group attribute, to a similar tape storage device, and/or map the one or more files, having the similar file group attribute, to the similar tape storage device. A value for the file group attribute may be determined upon creation of the one or more files or upon an operation by one or more applications. The one or more files, having the similar file group attribute, may be recalled from the tape storage device to the HSM upper tier storage device upon a recall operation specifying the similar file group attribute.

The operations of methods 600 and/or 700 may select the tape storage device associated with the similar file group attribute for migration of the one or more files to the tape storage device upon verifying the similar file group attribute is registered in a mapping table, and/or select an available tape storage device for migration of the one or more files from the storage device in the first tier in the HSM system to the available tape storage device in the nth tier (e.g., lower, last, or final tier) of the HSM system upon verifying the similar file group attribute is unregistered in the mapping table.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for adding a migration file group to a hierarchical storage management (HSM) system for data co-location by a processor, comprising:
   automatically adding a file group attribute to each of a plurality of files in the HSM system to enable one or more applications to co-locate data, wherein the file group attribute is set by the one or more applications upon creating the plurality of files and is indicative that the plurality of files are to be stored together as a file group according to a determination by the one or more applications that the plurality of files are candidates to be read together at a future time period;

receiving a migration command to migrate data within the HSM system, wherein the migration command specifies the file group attribute;

responsive to receiving the migration command, determining that the data specified by the migration command includes those of the plurality of files having the file group attribute;

responsive to determining that the data includes the plurality of files having the file group attribute, consulting a mapping table to determine whether the file group attribute is registered to a tape storage device;

responsive to determining the file group attribute is not registered to the tape storage device nor any storage device in the HSM system or responsive to determining that the file group attribute is registered to the tape storage device in the mapping table yet the tape storage device currently has insufficient available storage space on a single media to accommodate the plurality of files, selecting an available storage device having the available storage space on the single media to accommodate all of the plurality of files having the file group attribute specified as the data in the migration command, wherein the mapping table is updated to register the file group attribute to the available storage device; and responsive to determining the file group attribute is registered to the tape storage device in the mapping table and the tape storage device has the available storage space on the single media to accommodate the plurality of files or responsive to registering the file group attribute to the available storage device in the mapping table, migrating each of the plurality of files in the file group, each having the file group attribute, from respective locations within a storage device in a first tier in the HSM system to the tape storage device or the available storage device in an nth tier of the HSM system to enable recalling of the plurality of files in the HSM system, wherein the plurality of files are stored together as the file group in the tape storage device or the available storage device in the nth tier of the HSM system.

2. The method of claim 1, further including automatically adding the file group attribute to each file extended attribute (EA) of the plurality of files.

3. The method of claim 1, further including determining a value for the file group attribute upon the creation of the plurality of files or upon an operation by the one or more applications.

4. The method of claim 1, further including recalling the plurality of files, having the file group attribute, from the tape storage device or the available storage device in the nth tier to the storage device in the first tier in the HSM system upon a recall operation specifying the file group attribute.

5. A system for adding a migration file group to a hierarchical storage management (HSM) system for data co-location, comprising:

one or more computers with executable instructions that when executed cause the system to:

automatically add a file group attribute to each of a plurality of files in the HSM system to enable one or more applications to co-locate data, wherein the file group attribute is set by the one or more applications upon creating the plurality of files and is indicative that the plurality of files are to be stored together as a file group according to a determination by the one or more applications that the plurality of files are candidates to be read together at a future time period;

receive a migration command to migrate data within the HSM system, wherein the migration command specifies the file group attribute;

responsive to receiving the migration command, determine that the data specified by the migration command includes those of the plurality of files having the file group attribute;

responsive to determining that the data includes the plurality of files having the file group attribute, consult a mapping table to determine whether the file group attribute is registered to a tape storage device;

responsive to determining the file group attribute is not registered to the tape storage device nor any storage device in the HSM system or responsive to determining that the file group attribute is registered to the tape storage device in the mapping table yet the tape storage device currently has insufficient available storage space on a single media to accommodate the plurality of files, select an available storage device having the available storage space on the single media to accommodate all of the plurality of files having the file group attribute specified as the data in the migration command, wherein the mapping table is updated to register the file group attribute to the available storage device; and responsive to determining the file group attribute is registered to the tape storage device in the mapping table and the tape storage device has the available storage space on the single media to accommodate the plurality of files or responsive to registering the file group attribute to the available storage device in the mapping table, migrate each of the plurality of files in the file group, each having the file group attribute, from respective locations within a storage device in a first tier in the HSM system to the tape storage device or the available storage device in an nth tier of the HSM system to enable recalling of the plurality of files in the HSM system, wherein the plurality of files are stored together as the file group in the tape storage device or the available storage device in the nth tier of the HSM system.

6. The system of claim 5, wherein the executable instructions further automatically add the file group attribute to each file extended attribute (EA) of the plurality of files.

7. The system of claim 5, wherein the executable instructions further determine a value for the file group attribute upon the creation of the plurality of files or upon an operation by the one or more applications.

8. The system of claim 5, wherein the executable instructions further recall the plurality of files, having the file group attribute, from the tape storage device or the available storage device in the nth tier to the storage device in the first tier in the HSM system upon a recall operation specifying the file group attribute.

9. A computer program product for, by a processor, adding a migration file group to a hierarchical storage management (HSM) system for data co-location, the computer program product comprising a non-transitory computer-readable storage medium having computer-readable program code portions stored therein, the computer-readable program code portions comprising:

an executable portion that automatically adds a file group attribute to each of a plurality of files in the HSM system to enable one or more applications to co-locate data, wherein the file group attribute is set by the one or more applications upon creating the plurality of files and is indicative that the plurality of files are to be stored together as a file group according to a determination by the one or more applications that the plurality of files are candidates to be read together at a future time period;

an executable portion that receives a migration command to migrate data within the HSM system, wherein the migration command specifies the file group attribute;

an executable portion that, responsive to receiving the migration command, determines that the data specified by the migration command includes those of the plurality of files having the file group attribute;

an executable portion that, responsive to determining that the data includes the plurality of files having the file group attribute, consults a mapping table to determine whether the file group attribute is registered to a tape storage device;

an executable portion that, responsive to determining the file group attribute is not registered to the tape storage device nor any storage device in the HSM system or responsive to determining that the file group attribute is registered to the tape storage device in the mapping table yet the tape storage device currently has insufficient available storage space on a single media to accommodate the plurality of files, selects an available storage device having the available storage space on the single media to accommodate all of the plurality of files having the file group attribute specified as the data in the migration command, wherein the mapping table is updated to register the file group attribute to the available storage device; and an executable portion that, responsive to determining the file group attribute is registered to the tape storage device in the mapping table and the tape storage device has the available storage space on the single media to accommodate the plurality of files or responsive to registering the file group attribute to the available storage device in the mapping table, migrates each of the plurality of files in the file group, each having the file group attribute, from respective locations within a storage device in a first tier in the HSM system to the tape storage device or the available storage device in an nth tier of the HSM system to enable recalling of the plurality of files in the HSM system, wherein the plurality of files are stored together as the file group in the tape storage device or the available storage device in the nth tier of the HSM system.

10. The computer program product of claim 9, further including an executable portion that automatically adds the file group attribute to each file extended attribute (EA) of the plurality of files.

11. The computer program product of claim 9, further including an executable portion that
determines a value for the file group attribute upon the creation of the plurality of files or upon an operation by the one or more applications.

12. The computer program product of claim 9, further including an executable portion that recalls the plurality of files, having the file group attribute, from the tape storage device or the available storage device in the nth tier to the storage device in the first tier in the HSM system upon a recall operation specifying the file group attribute.

* * * * *